Nov. 2, 1965

NOBUTOSHI KIHARA 3,215,772

MAGNETIC RECORDING OF SIGNALS CONTAINING SYNCHRONIZING INFORMATION

Filed Oct. 2, 1961

INVENTOR.

Nobutoshi Kihara

BY Hill, Sherman, Meroni, Gross & Simpson

ATTORNEYS

United States Patent Office 3,215,772
Patented Nov. 2, 1965

3,215,772

MAGNETIC RECORDING OF SIGNALS CONTAINING SYNCHRONIZING INFORMATION

Nobutoshi Kihara, Shibuya-ku, Tokyo, Japan, assignor to Sony Corporation, Tokyo, Japan, a corporation of Japan Filed Oct. 2, 1961, Ser. No. 142,172
Claims priority, application Japan, Oct. 5, 1960, 35/40,856
9 Claims. (Cl. 178—6.6)

This invention relates to a signal recording system and more particularly to such a recording system in which signals including periodic synchronizing components, for instance television picture signals, are magnetically recorded on a magnetic medium as successive tracks which extend in a general direction at right angles or at a skew angle with respect to the direction of movement of the magnetic medium. In the case where a signal containing a synchronizing component comprises a television picture signal, loss of horizontal synchronization occurs frequently when the signal is recorded on a magnetic medium and the recorded signal is scanned subsequently to reproduce the recorded television picture. This condition which will be termed horizontal synchronization step-out map occur because of fluctuations in the speed of the record medium, for example, which cause the reproducing head to simultaneously scan the recorded synchronizing signals of two adjacent tracks.

One object of the present invention is to provide a signal recording system for eliminating such horizontal synchronization step-out.

Another object of the invention is to provide a signal reproducing system wherein the synchronizing signals as reproduced from the record medium always occur at predetermined intervals corresponding to the intervals between the original synchronizoing signals recorded on the record medium in spite of any errors in scanning of the recorded trace during reproduction.

In accordance with the teachings of the present invention, a signal recording and reproducing system is provided wherein a signal recorded at one speed may be reproduced at a slower or higher speed or at zero tape speed without loss of synchronization and without requiring a servo mechanism to adjust the scanning path of the magnetic head relative to the recorded tracks.

Other objects, features and advantages of this invention will be apparent from the following description taken in connection with the accompanying drawings, in which.

Figure 1:
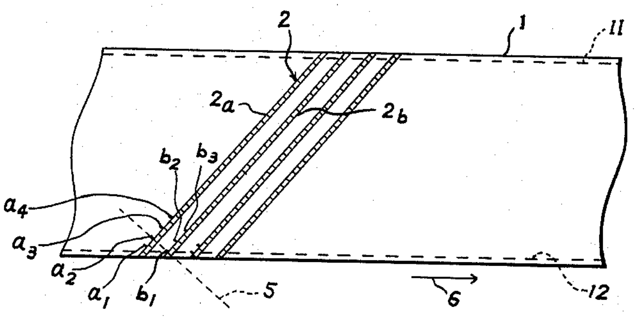
FIGURE 1 is a schematic diagram illustrating recorded tracks on a magnetic record medium for explaining a signal recording system according to this invention.
Figure 2:
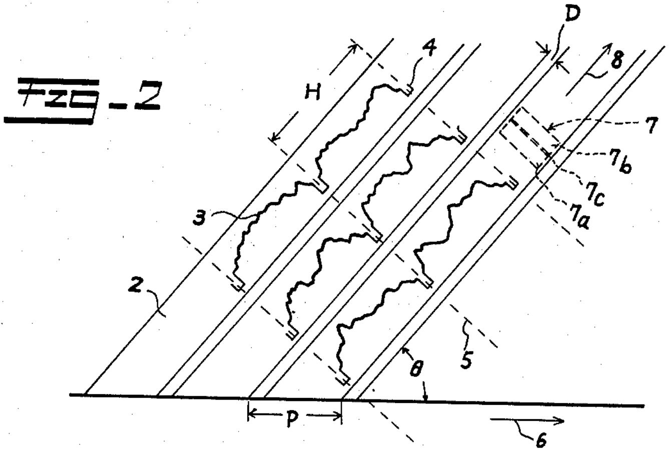
FIGURE 2 is a partially enlarged explanatory diagram illustrating the principles of a signal recording system according to this invention.

FIGURE 1 illustrates, by way of example, a magnetic record medium 1 having a signal recorded thereon as a series of straight line tracks 2 extending at a skew angle with respect to the direction of travel of the record medium indicated by the arrow 6 in FIGURE 1. By way of example, the tracks 2 may have a picture signal including synchronizing signals recorded thereon. FIGURE 2 shows graphically the variation of amplitude of a picture signal 3 as it might be recorded on successive tracks 2 in FIGURE 1. In the diagram of FIGURE 2, the angle between the direction of tracks 2 and the direction of movement of the record medium 1 has been indicated by the angle $\theta$. The synchronizing signals in FIGURE 2 and in FIGURE 3 have been indicated diagramatically at 4 and may, for example, occur between successive lines of the picture signal 3. Each track such as indicated at 2 in FIGURE 1 may receive successive scanning lines of a picture signal forming a frame or field of the moving image being recorded.

By way of example, for interlaced scanning, 262½ lines may be recorded along one track 2 across the record medium and constitute one field or sub-frame of the image signal. Two successive tracks 2 on the record medium 1 would thus constitute the complete frame of 525 lines. Of course, where a plurality of heads are utilized to successively scan the record medium 1, the scanning periods of the respective head may overlap slightly at the margins of the record medium to avoid discontinuities. The record medium may take the form of a tape or sheet having a magnetizable layer on one surface thereof, for example.

A conventional magnetic recording head 7 has been indicated in FIGURE 2 for generating the tracks 2 of FIGURE 1. The head 7 would move in the direction of arrow 8 substantially to generate the successive tracks 2, and of course move at a substantially greater speed than the speed of movement of the tape in the direction of arrow 6. The head 7 has been illustrated as comprising a pair of pole pieces *7a* and *7b* having a non-magnetic gap *7c* therebetween. The gap *7c* is illustrated as having a very small dimension in the direction of movement of the head 7 which is indicated by the arrow 8 and as having a long dimension substantially equal to the width of the track 2 which dimension is at right angles to the direction of movement indicated by arrow 8. The magnetic fields recorded on the record medium 1 by this type of head extend substantially in the direction of the arrow 8 since they are produced by a recording field extending between poles *7a* and *7b* and across the gap *7c*.

Any suitable type recording mechanism may be utilized for causing the head 7 to scan successive tracks such as indicated at 2 in FIGURE 1 on the record medium. By way of example, the tape 1 may be guided over somewhat more than one-half the periphery of a rotating drum at an angle to the drum axis equal to the complement of the angle $\theta$. The surface speed of the drum may correspond to the desired tape speed in the direction of arrow 6. A pair of magnetic heads may be mounted for high speed rotation about the axis of the drum and may engage the active surface of the tape through a slot in the drum. The dimensions of the drum and of the tape may be such that the heads are simultaneously in contact with the opposite lateral margins of the tape and scan across the tape along tracks such as indicated at 2 in FIGURE 1.

In accordance with the present invention, the synchronizing signals recorded on successive tracks are aligned along lines such as indicated at 5 which are parallel to the long direction of the gap *7c*. By this means, if during reproduction the head 7 scans between successive tracks 2, the magnetic head will sense the synchronizing signals of the adjacent tracks simultaneously and there will be no loss of horizontal synchronization. As the head scans between successive tracks 2, it will tend to average the intensities of the picture signal 3 as found on the adjacent tracks, but since the lines of adjacent tracks which are scanned are separated by only a short interval in time and relate to closely adjacent portions of the image which has been recorded, a useable picture and proper horizontal synchronizing signals are still obtained. The direction across the gap *7c* between the poles *7a* and *7b* of the head 7 will be termed the effective scanning direction, and it will be observed that the synchronizing signals 4 are recorded on the tape 1 in such a manner that the synchronizing signals of adjacent tracks 2 are in alignment in the direction at right angles to the effective scanning direction of the head which produced the synchronizing signals.

Figure 3:
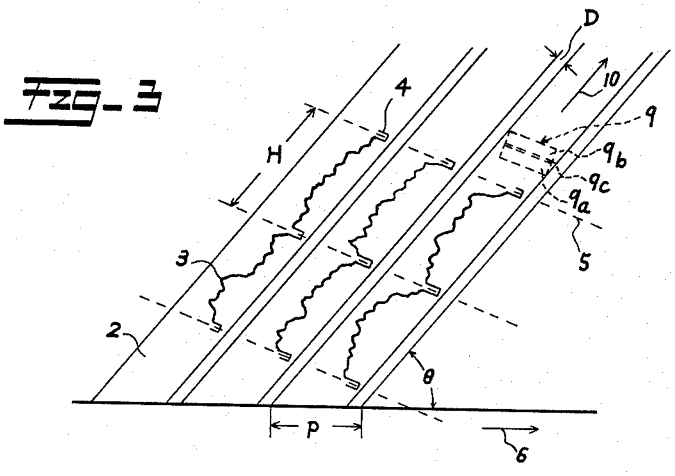
FIGURE 3 is a partially enlarged explanatory diagram illustrating the principle of a modified signal recording system according to this invention.

FIGURE 3 illustrates the identical principle for the case where a recording head 9 having poles 9*a* and 9*b* defines a gap 9*c* which is not at right angles to the direction of movement of the head indicated by arrow 10. In this case, the effective scanning direction of the head 9 is not the same as the direction of movement of the head indicated by arrow 10, while in FIGURE 2 the direction of effective scanning of the head 7 was coincident with the direction of movement of the head represented by arrow 8. In FIGURE 3, the synchronizing pulses 4 recorded on the successive tracks 2 are in alignment with respect to a direction parallel to the long dimension of the gap 9*c* and at right angles to the effective direction of scanning of head 9, but are not at right angles to the direction of head movement indicated by arrow 10. It will be apparent that in FIGURE 3 if the head 9 during playback scans between successive tracks 2, the synchronizing signals of adjacent tracks will be sensed by the head 9 simultaneously and there will be no loss of horizontal synchronism.

In order to illustrate the relationship between the various parameters, let it be assumed that the relative speed between a magnetic tape 1 and a head such as 7 or 9 is V millimeters per second, the distance between the adjacent horizontal synchronizing signals 4 along a track 2 is H millimeters, the angle made by a track 2 with respect to the direction of movement of the tape indicated by arrow 6 is $\theta$, the pitch between adjacent tracks 2 in the direction of arrow 6 is P millimeters and the tape speed in the direction of arrow 6 is S millimeters per second. Assume that a picture is generated at a vertical scanning frequency of 60 cycles per second with interlaced scanning to generate a television signal for recording by the system of the present invention with the number of horizontal scanning lines being 525 in each complete frame of the signal. If the heads make a scan of the tape every $\frac{1}{60}$ of a second exclusive of overlap at the margins of the tape, effectively 262½ lines will be recorded in each track such as indicated at 2 in FIGURE 1. Assuming an instantaneous image is subdivided into 525 horizontal lines numbered consecutively from the top to the bottom of the image, the odd numbered lines may be scanned first and the line number 525 will be partly at the end of a first track 2 and partly at the beginning of the next track followed by the even numbered lines 2, 4, 6, 8, etc. The dash lines 11 and 12 in FIGURE 1 may indicate regions where both heads are simultaneously operative, that is regions of overlap. For example, as the head scanning track 2*a* is recording the first half of line 525, a second head may be recording the same portion at the beginning of track 2*b* in the region of overlap adjacent line 12. Similarly, when the second head is recording the first part of odd line number 525 on track 2*b* just inside of the region of overlap indicated by line 12, the head scanning track 2*a* will be recording the last half of odd line 525 in the margin defined by line 11. In FIGURE 1, the synchronizing signals of track 2*a* are indicated by slant lines adjacent the track. The first synchronizing signal of track 2*a* inside of line 12 may be the synchronizing signal between odd lines number 1 and 3 of a frame and has been designated $a_1$; the synchronizing signal between lines 3 and 5 has been designated $a_2$ and so forth. The first synchronizing pulse in track 2*b* may be designated $b_1$ and will occur between odd line 525 and even line number 2 of the video signal. Pulse or synchronizing signal $b_1$ will thus be one-half the line length H on the tape from the marginal line 12. One of the synchronizing signals of track 2*a* will be in alignment with the synchronizing pulse $b_1$; for example synchronizing signal $a_2$ of the track 2*a* may be in alignment with synchronizing signal $b_1$ of track 2*b*. If the synchronizing marks are designated 1, 2, 3 . . . instead of $a_1, a_2, a_3, \ldots$ and X is taken as equal to the number of the synchronizing mark of one track such as 2*a* which is in alignment with the first synchronizing mark such as $b_1$ of the next track 2*b*, then the following relationship holds:

$$P \cos \theta = (X - \tfrac{1}{2})\, H \text{ millimeters}$$

The following relationships also hold:

$$S = P \times 60 \text{ millimeters per second}$$

$$V = H \times 525 \times 60 \text{ millimeters per second}$$

When reproducing signals recorded in accordance with the present invention even if the magnetic reproducing head scans between two adjacent tracks, the time of occurrence of the synchronizing signals is not altered so that no synchronization step-out results. When the magnetic medium is stopped with the magnetic head in operation, even if the magnetic head scans repeatedly between a pair of recorded tracks, the synchronizing signals occur at the proper intervals and synchronization step-out does not occur. Moreover, even when wow or flutter is generated in driving the record medium in the direction 6 so as to alter the scanning path of the head relative to the tracks 2, synchronization step-out does not take place.

If the magnetic tape is made to start from a stop position with the magnetic head in operation for reproducing recorded signals, the head will not precisely scan successive tracks 2 as the tape increases in speed, but the synchronizing signal period remains constant. Thus, if for any cause the relative speed of the magnetic head and a magnetic medium is changed, there is no change in the time interval between reproduced synchronizing signals.

Accordingly, when a record medium having a recording thereon in accordance with the present invention is reproduced and the reproduced signal applied to a television receiving set, even if the relative speed of the magnetic head and medium is greatly changed the synchronization step-out which has heretofore been apt to occur can be avoided, and exact synchronization is maintained. Accordingly, the tape may be run at a very low speed to produce a so-called slow speed motion picture, the tape may be run at a relatively higher speed to produce a high speed motion picture or the tape can be stopped to produce a stationary picture, if desired, without causing any synchronization step-out. Where the speed of the tape is different from that utilized during recording, the quality of the picture may be somewhat lowered, but does not deteriorate essentially. The horizontal synchronization is maintained without requiring a servo mechanism to maintain the magnetic head on the successive recorded tracks.

In the above embodiments, reference has been made particularly to television signals including synchronizing signals, but it will be apparent that this invention is not limited to such television signals but may be applied to any signal having a periodically occurring synchronizing portion. In the illustrated embodiments, the tracks 2 have been illustrated as being of the straight line type, but the same concepts are applicable where the tracks are in the form of portions of circular arcs or the like. Such a circular arc would be skewed with respect to the direction of tape travel where the arc intersects the opposite margins of the tape at points which are substantially offset in the direction of tape travel—that is, offset more than the offset produced by the longitudinal movement of the tape during the head traverse.

It will be apparent that many modifications and variations may be effected without departing from the scope of the novel concepts of the present invention.

I claim as my invention:

1. A magnetic recording system comprising a magnetic medium, and a magnetic recording head arranged to record tracks on the record medium extending in lines across the magnetic medium which are generally at a skew angle with respect to the direction of movement of the magnetic medium, with the beginning and end of each track on the record medium being offset from each other in the direction of movement of the record medium a distance substantially greater than the distance the record medium travels during recording of the track, said magnetic recording head being energized by a signal current including synchronizing signals occurring at predetermined intervals and said magnetic recording head recording said synchronizing signals on said tracks with the synchronizing signals on adjacent tracks being aligned in a direction perpendicular to the effective scanning direction of the magnetic recording head.

2. A magnetic reproduction system comprising a magnetic medium having a succession of record tracks extending thereacross and disposed generally at a skew angle with respect to the direction of movement of the magnetic medium with the beginning and end of each track on the magnetic medium being offset in the direction of movement of the magnetic medium a distance substantially greater than the distance the record medium travels during recording of the track, said magnetic medium having synchronizing signals recorded at predetermined intervals along said tracks with the synchronizing signals of adjacent tracks being aligned along a predetermined direction, and a magnetic reproducing head for scanning said record tracks having an effective scanning axis disposed at right angles to the direction of alignment of the synchronizing signals of adjacent tracks.

3. A magnetic record comprising a magnetic record medium having a signal including synchronizing portions recorded thereon as a succession of recorded magnetic fields directed transversely of the record medium and disposed along successive record tracks extending across the magnetic medium at a skew angle with respect to the direction of travel of the medium with the beginning and end of each track on the magnetic medium being offset from each other in the direction of travel of the medium a distance substantially greater than the distance the record medium travels during recording of the track with the recorded synchronizing portions of adjacent tracks being aligned in a predetermined direction transverse to the tracks which predetermined direction is substantially at right angles to the direction of said recorded magnetic fields.

4. The method of recording a signal having periodic synchronizing portions which comprises moving a magnetic recording head along successive lines extending at a skew angle with respect to the direction of movement of a magnetic medium, supplying the signal including the periodic synchronizing portions to the recording head to record the signal including such synchronizing portions along said lines, and coordinating the speed of movement of the magnetic medium and the skew angle of movement of the recording head during recording so that the synchronizing portions of successive adjacent lines recorded on the record medium are in alignment in a direction at right angles to the magnetic fields recorded by the magnetic recording head on the magnetic medium.

5. A magnetic recording system comprising means for moving a tape record medium in a predetermined direction, a magnetic recording head, means mounting said head for successive scanning movements in a direction across said tape record medium at a skew angle relative to the direction of movement of the record medium, means for supplying a signal including synchronizing portions occurring at predetermined intervals to said head to record said signal on successive tracks extending at said skew angle across said record medium, said head having a predetermined orientation to record magnetic fields having a predetermined direction in the successive tracks, and the skew angle of scanning movements of the head being correlated with the speed of movement of the record medium to place the synchronizing portions recorded on adjacent tracks substantially in alignment in a direction at right angles to the direction of the magnetic fields recorded by said head.

6. A magnetic recording system comprising magnetic recording head means including a pair of poles with a non-magnetic gap therebetween, said head means having an effective scanning direction corresponding to the direction across said gap between said poles, a magnetic record medium movable in a direction of travel past said head means in coupling relation to said pair of poles at said gap therebetween, said head means being mounted for successive movements along a path extending at an oblique angle to the direction of travel of the record medium to record magnetic fields along successive tracks on the record medium, means for supplying a signal current to the head means comprising synchronizing signals occurring at predetermined intervals, and means for moving the record medium and the magnetic head means at related speeds during recording such that synchronizing signals occur at points in time when the head means is at scanning positions relative to successive adjacent tracks on the record medium which scanning positions are in alignment with respect to the direction at right angles to the effective scanning direction of the head means so that if the head means scans between adjacent tracks during playback the head means will be in scanning relation to synchronizing signals on both of the adjacent tracks simultaneously.

7. The method of recording a signal comprising synchronizing signals occurring at predetermined intervals which comprises moving a magnetic record medium in a direction of travel, moving magnetic recording head means which produces magnetic recording fields extending in an effective scanning direction successively along a path extending at an oblique angle to the direction of travel of the record medium while supplying said signal comprising said synchronizing signals to said head means to record magnetic fields along successive tracks on the record medium, and moving the record medium and the magnetic head means at related speeds such that the synchronizing signals supplied to the head means occur at points in time when the head means is at scanning positions relative to adjacent tracks on the record medium which scanning positions are in alignment with respect to the direction at right angles to the effective scanning direction of the head means so that if the head means scans between adjacent tracks during playback the head means will be in scanning relation to synchronizing the signals on both of the adjacent tracks simultaneously.

8. A magnetic playback system comprising a magnetic medium having a succession of record tracks extending thereacross and disposed generally at a skew angle with respect to the direction of movement of the magnetic medium with the beginning and end of each track being offset from each other in the direction of movement of the magnetic medium a distance substantially greater than the distance of travel of the record medium during scanning of the track, said magnetic medium having synchronizing signals recorded as magnetic fields at predetermined intervals along said tracks with the synchronizing signals of adjacent tracks being aligned along a predetermined direction which predetermined direction is at right angles to the direction of the recorded fields representing said synchronizing signals, magnetic playback head means for scanning said record tracks having an effective scanning direction corresponding to the direction of the recorded magnetic fields representing said synchronizing signals, and means mounting said magnetic playback head means for successive movement along a path extending obliquely with respect to the direction of movement of the magnetic medium and substantially corresponding to the skew angle of said record tracks to scan said record tracks and to reproduce the synchronizing signals at proper intervals even when scanning between successive tracks on the magnetic medium.

9. The method of recording an electric signal having periodic synchronizing portions which comprises moving a record medium along a direction of travel thereof, moving a plurality of magnetic head means successively along a path extending at an oblique angle to the direction of travel of the record medium with the head means having an effective scanning direction, supplying one field of a video signal together with the horizontal synchronizing signals thereof to each of the magnetic head means during one scanning movement thereof across the record medium to record a field of the signal as a track extending obliquely to the direction of travel of the record medium, and moving the record medium and the magnetic head means at related speeds such that horizontal synchronizing signals of the successive fields recorded on the successive tracks are in alignment substantially with respect to the direction at right angles to the effective scanning direction of the head means and at right angles to the direction of the magnetic fields recorded on the record medium, and scanning the recorded signal by means of magnetic head means having effective scanning directions substantially corresponding to the direction of the magnetic fields recorded on the record medium so that if the magnetic head means scans between successive tracks it will reproduce recorded synchronizing signals of the adjacent tracks simultaneously to maintain proper horizontal synchronization in the reproduced signal from the magnetic head means.

References Cited by the Examiner

Video Tape Recording, Bernstein (John F. Rider Publisher, Inc., New York, July 1960), pages 107–109 relied upon.

DAVID G. REDINBAUGH, *Primary Examiner.*

ROY LAKE, *Examiner.*